(12) United States Patent
Srinivasan et al.

(10) Patent No.: US 8,913,613 B2
(45) Date of Patent: Dec. 16, 2014

(54) METHOD AND SYSTEM FOR CLASSIFICATION AND MANAGEMENT OF INTER-BLADE NETWORK TRAFFIC IN A BLADE SERVER

(75) Inventors: Arvind Srinivasan, San Jose, CA (US); Marcelino M. Dignum, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 539 days.

(21) Appl. No.: 13/028,593

(22) Filed: Feb. 16, 2011

(65) Prior Publication Data

US 2012/0207158 A1 Aug. 16, 2012

(51) Int. Cl.
*H04L 12/28* (2006.01)
*H04L 12/18* (2006.01)
*H04L 12/761* (2013.01)
*H04L 12/851* (2013.01)

(52) U.S. Cl.
CPC .............. *H04L 12/18* (2013.01); *H04L 45/16* (2013.01); *H04L 47/2483* (2013.01)
USPC ............................................. 370/390

(58) Field of Classification Search
CPC ........................................... H04L 12/18
USPC ................. 370/229, 254, 389, 392, 395, 401
See application file for complete search history.

(56) References Cited

U.S. PATENT DOCUMENTS

| 7,120,152 B2* | 10/2006 | Park ..................... 370/395.32 |
|---|---|---|
| 7,613,132 B2 | 11/2009 | Tripathi et al. |
| 7,827,598 B2* | 11/2010 | Moran et al. ................ 726/4 |
| 7,885,257 B2 | 2/2011 | Droux et al. |
| 8,295,275 B2 | 10/2012 | Mann |
| 2006/0045088 A1* | 3/2006 | Nguyen .................. 370/392 |
| 2006/0251109 A1* | 11/2006 | Muller et al. ............. 370/463 |
| 2007/0019646 A1 | 1/2007 | Bryant et al. |
| 2007/0183418 A1* | 8/2007 | Riddoch et al. .......... 370/389 |
| 2009/0150576 A1* | 6/2009 | Madruga et al. ........... 710/28 |
| 2009/0150883 A1* | 6/2009 | Tripathi et al. ............ 718/1 |
| 2009/0328073 A1 | 12/2009 | Tripathi |
| 2010/0332698 A1* | 12/2010 | Muller .................. 710/57 |
| 2011/0019574 A1 | 1/2011 | Malomsoky et al. |
| 2011/0080830 A1 | 4/2011 | Ko et al. |
| 2012/0017265 A1 | 1/2012 | Twitchell, Jr. |

OTHER PUBLICATIONS

International Search Report and Written Opinion for PCT/US2012/020746 dated Mar. 13, 2012 (9 pages).
International Preliminary Report on Patentability issued in PCT/US2012/020746, mailed on Aug. 21, 2013 (7 pages).

* cited by examiner

*Primary Examiner* — Dang Ton
*Assistant Examiner* — Nourali Mansoury
(74) *Attorney, Agent, or Firm* — Osha Liang LLP (57) ABSTRACT

A system and method for classifying a multicast packet, involving receiving, at a classification engine, the multicast packet sent from a packet source; determining, based on a source address of the multicast packet, a Direct Memory Access (DMA) filter vector; determining, based on a destination address of the multicast packet, a DMA target vector, where the DMA target vector includes a listing of DMA channels which are available to transfer the multicast packet; determining a DMA final vector based on the DMA filter vector and the DMA target vector; and sending the multicast packet according to the DMA final vector.

19 Claims, 8 Drawing Sheets

L2 Table 210

| L2 Address | Network Function |
|---|---|
| L2a | NFa |
| ● | ● |
| L2d | NFd |
| ● | ● |
| L2s | NFs |
| ● | ● |
| L2z | NFz |

FIG. 2A

NF Table 220

| Network Function | DMA Target(s) |
|---|---|
| NFa | Ta |
| ● | ● |
| NFs | Ts |
| ● | ● |
| NFz | Tz |

FIG. 2B

Multicast/Broadcast Table 230

| Key | DMA Target(s) |
|---|---|
| Ka | Ta |
| ● | ● |
| Kd | Td |
| ● | ● |
| Kz | Tz |

METHOD AND SYSTEM FOR CLASSIFICATION AND MANAGEMENT OF INTER-BLADE NETWORK TRAFFIC IN A BLADE SERVER

BACKGROUND

Conventionally, in the computer-related arts, a network is an arrangement of physical computer systems configured to communicate with each other. In some cases, the physical computer systems may include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (i.e., using a tangible connection medium such as Ethernet cables) or wireless (i.e., using an intangible connection medium such as radio waves). Different connection methods may also be combined in a single network. For example, a wired network may be extended to allow devices to connect to the network wirelessly. However, core network components such as routers, switches, and servers are generally connected using physical wires.

To create a wired network, computer systems must be physically connected to each other. That is, the ends of physical wires (e.g., Ethernet cables) must be physically connected to network interface cards in the computer systems forming the network. To reconfigure the network (e.g., to replace a server or change the network topology), one or more of the physical wires must be disconnected from a computer system and connected to a different computer system. Ethernet is defined within the Institute of Electrical and Electronics Engineers (IEEE) 802.3 standards, which are supervised by the IEEE 802.3 Working Group.

Network traffic may be transmitted over a network (e.g., the Internet) from a sending system to a receiving system (e.g., from one computer system to another computer system). Each system may be configured with a physical network interface card (PNIC). A PNIC is a physical hardware device found in a typical computer system that may be used to service one or more network connections by sending and receiving network traffic. Typically, network traffic is transmitted in the form of data packets, where each data packet includes a header and a payload. The header contains information regarding the source address, destination address, size, transport protocol used to transmit the data packet, and various other information associated with the data packet. The payload contains the actual data to be transmitted to the receiving system.

SUMMARY

In general, in one aspect, the invention relates to a computer readable storage medium having computer readable program code embodied therein, the computer readable program code adapted to, when executed by a processor, implement a method for classifying a multicast packet. The method includes receiving, at a classification engine, the multicast packet sent from a packet source; determining, based on a source address of the multicast packet, a Direct Memory Access (DMA) filter vector. The method also includes determining, based on a destination address of the multicast packet, a DMA target vector, where the DMA target vector includes a listing of DMA channels which are available to transfer the multicast packet. The method also includes determining a DMA final vector based on the DMA filter vector and the DMA target vector. The method also includes sending the multicast packet according to the DMA final vector.

In general, in one aspect, the invention relates to a system. The system includes a chassis interconnect, a physical network interface, and a first blade and a second blade communicatively coupled with each other via the chassis interconnect. The first blade and the second blade share the physical network interface. The first blade includes a packet source, and the second blade includes a packet destination. The system also includes a network express manager (NEM) configured to receive a multicast packet from the packet source, determine, based on a source address of the multicast packet, a Direct Memory Access (DMA) filter vector, determine, based on a destination address of the multicast packet, a DMA target vector, determine a DMA final vector based on the DMA filter vector and the DMA target vector, and classify the multicast packet according to the DMA final vector.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for the routing and classification of inter-blade traffic within a blade chassis. Specifically, embodiments of the invention provide a system and method for routing and classification of a multicast/broadcast packet within a blade chassis while preventing the packet from being routed back to the packet source. In one or more embodiments, a target vector and a filter vector are determined for the multicast/broadcast packet. A mask operation of the target vector may be performed using the filter vector to obtain a final vector. The final vector may then be used to route the multicast/broadcast packet. In one or more embodiments, the target vector, the filter vector, and the final vector may be bitmaps representing Direct Memory Access (DMA) channels.

Embodiments of the invention involve the use of one or more physical network interface cards (PNICs) in accordance with PCI-SIG® SR-IOV (single-root) and PCI-SIG® MR-IOV (multi-root) specifications. PCI-SIG® and PCI™ are trademarks of the Peripheral Component Interconnect-Special Interest Group (PCI-SIG) of Beaverton, Oreg.

Under the PCI-SIG® SR-IOV specification, a PCI™-compliant PNIC (i.e., a single root) is defined as having at least one network function used in the configuration and management of the PNIC. In one or more embodiments of the invention, a physical function is a full PCI™ function used for configuring and managing a PNIC. In one or more embodiments of the invention, a virtual function is a lightweight PCI™ function used for data movement of network traffic sent and received by the PNIC. While invoking a physical function enables control of a PNIC, invoking a virtual function does not provide control of a PNIC. Accordingly, in accordance with the PCI-SIG® SR-IOV specification, embodiments of the invention may use a network function to implement a network function mapping between a virtual machine executing on a host computer system and the PCI™-compliant PNIC operatively connected to the host computer system. Under the PCI-SIG® MR-IOV specification, a number of PCI™-compliant PNICs (i.e., multiple roots) are operative in tandem with one or more virtual machines executing for a host computer system.

Using the network function mapping, a datapath may be implemented between the virtual machine and the PNIC such that the virtual machine is provided with direct hardware access to the PNIC. Accordingly, the virtual machine may use the network function to directly transfer network traffic (i.e., data packets) between the virtual machine and the PNIC. Said another way, the network traffic is transferred between the virtual machine and the PNIC without additional processing by any intermediate layers (e.g., hypervisor, host operating system). In one or more embodiments, the network function may use Direct Memory Access (DMA) channels to perform such transfers of network traffic.

Figure 1A:
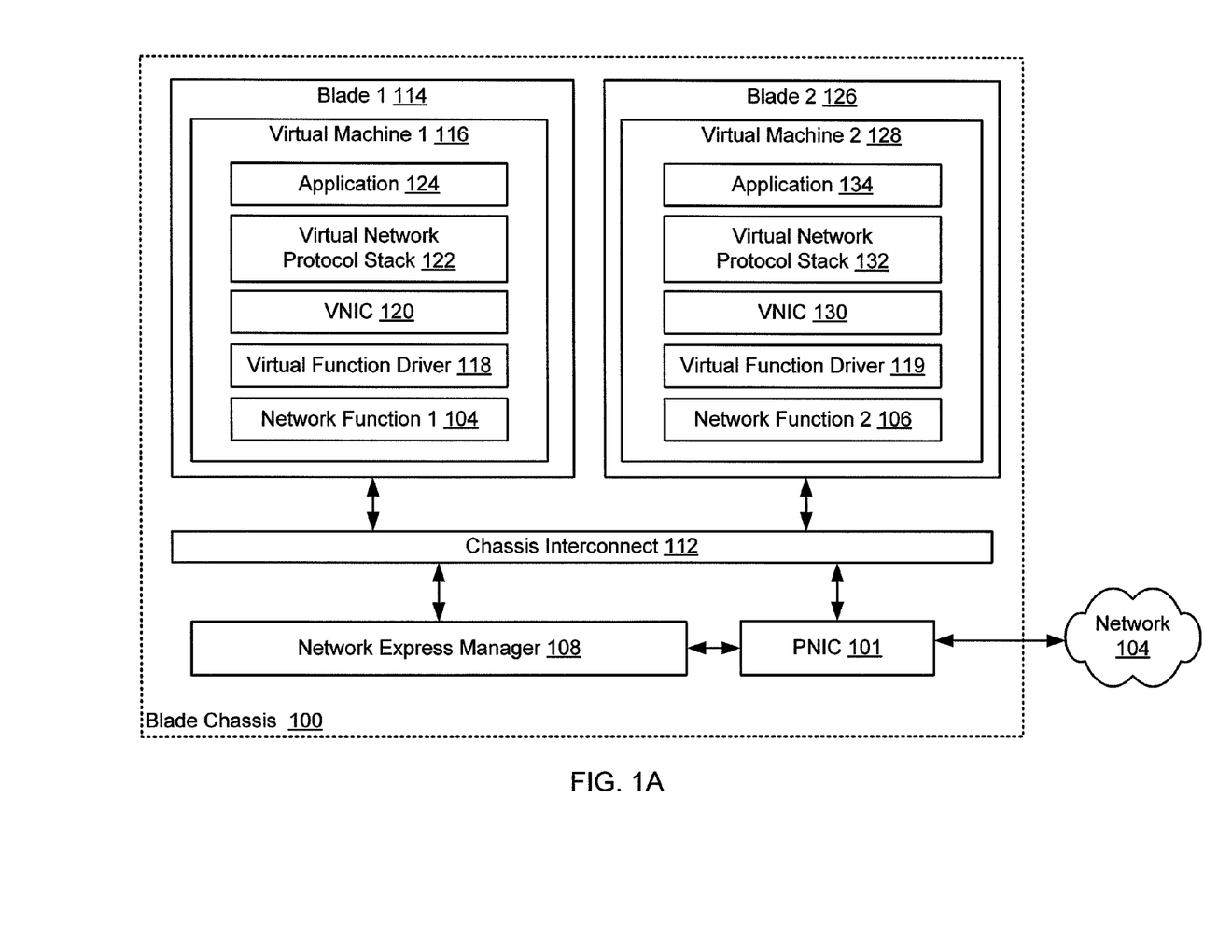
FIGS. 1A-1B show examples of a system, in accordance with one or more embodiments of the invention.

FIG. 1A shows an example of a system, in accordance with one or more embodiments of the invention. Specifically, FIG. 1A shows components for a blade chassis (100) in accordance with one or more embodiments of the invention. In one or more embodiments of the invention, the blade chassis (100) may be an IBM BladeCenter® chassis, an HP BladeSystem enclosure by Hewlett Packard Inc., or any other type of blade chassis. BladeCenter® is a registered trademark of International Business Machines, Inc. (IBM), headquartered in Armonk, N.Y. As shown in FIG. 1A, in one or more embodiments of the invention, the blade chassis (100) may include a physical network interface (PNIC) (101), a chassis interconnect (112), multiple blades (e.g., blade 1 (114), blade 2 (126)) operatively connected by the chassis interconnect (112), and a network express manager (NEM) (108). The NEM (108) is described below with reference to FIG. 1B.

In one or more embodiments of the invention, the PNIC (101) is a hardware device operatively connected to the blade chassis (100). Specifically, the PNIC (101) is configured to send and receive network traffic transmitted to and from the blade chassis (100) in the form of data packets. The PNIC (101) may include one or more network ports (e.g., Ethernet ports) and provide an interface between the blade chassis (100) and a network (104) (e.g., a local area network, a wide area network, the Internet, etc.). As such, the PNIC (101) may service a network connection by transferring the inbound and outbound network traffic associated with the network connection. In one or more embodiments of the invention, the blade chassis (100) may be connected to multiple networks, for example using multiple network ports. In one or more embodiments of the invention, there may be a single PNIC (101) for the blade chassis (100) (i.e., a single root blade chassis configuration). Alternatively, in one or more other embodiments of the invention, there may be multiple PNICs (101) for the blade chassis (100) (i.e., a multi-root blade chassis configuration).

In one or more embodiments of the invention, the PNIC (101) may be a PCI™-compliant PNIC, such that the PNIC (101) is configured with one or more network functions that may be used in the configuring and managing of the PNIC (101). For example, in one or more embodiments of the invention, a network function may be a physical or virtual function used to manage data movement for the PNIC (101). Specifically, in accordance with the PCI-SIG® SR-IOV and MR-IOV specifications, one or more embodiments of the invention may use a network function to implement a network function mapping between a virtual machine (116, 128) executing on a blade (114, 126) and the PCI™-compliant PNIC operatively connected to the blade chassis.

In one or more embodiments of the invention, a blade (114, 126) refers to a computer system included in a blade chassis (e.g., the blade chassis (100) shown in FIG. 1A). In one or more embodiments of the invention, a blade (114, 126) may include one or more processors and associated memory. In one or more embodiments of the invention, a blade (114, 126) may also include a storage device (e.g., a hard drive) and numerous other elements and functionalities typical of modern computer systems such as a keyboard, a mouse, a monitor, and/or other input/output means. In one or more embodiments of the invention, a blade (114, 126) may include fewer components than a stand-alone computer system or a conventional server. Alternatively, in one or more other embodiments of the invention, a fully-featured stand-alone computer system or conventional server may be used instead of (or in combination with) blades (114, 126) in a blade chassis.

In one or more embodiments of the invention, a blade (114, 126) includes a host operating system (not shown) configured to execute one or more virtual machines (e.g., Virtual Machine 1 (116), Virtual Machine 2 (128)). In one or more embodiments, a virtual machine (116, 128) is an isolated software execution environment hosted on a host operating system (not shown). Specifically, in accordance with embodiments of the invention, a virtual machine (116, 128) is configured to simulate the execution of a process as if the process were executing on a physical computing device.

In one or more embodiments of the invention, one or more executable software processes may be hosted on a virtual machine (116, 128) for a blade (114, 126). For example, as shown in FIG. 1A, each virtual machine (116, 128) may host an application (124, 134), a virtual network protocol stack (122, 132), a virtual network interface card (VNIC) (120, 130), a network function driver (118, 119), and a network function (105, 106).

In one or more embodiments of the invention, the application (124, 134) may be any user-level or kernel-level software process. In one or more embodiments of the invention, execution of the application (124, 134) may result in the generation and sending of network traffic from a virtual machine (116, 128) over the network (104). Likewise, the application (124, 134) may be a designated recipient for network traffic sent to and received by the virtual machine (116, 128) over the network (104). Examples of user-level applications include, but are not limited to, e-mail client software, web browsing software, or any other desktop software application. Examples of kernel-level applications include, but are not limited to, a guest operating system (not shown).

The guest operating system (not shown) executing on the virtual machine (116, 128) may or may not be the same as a host operating system (not shown) for the blade (114, 126). Further, in one or more embodiments of the invention, the host operating system (not shown) for a blade (114, 126) may serve as a host to multiple virtual machines (not shown). In such embodiments, each virtual machine includes a separate instance of a guest operating system. For example, the Xen® virtualization project allows for multiple guest operating systems executing in a host operating system. Xen® is a trademark overseen by the Xen Project Advisory Board. Further, in accordance with one or more embodiments of the invention, the virtual machines may include many different types of functionality, such as a switch, a router, a firewall, a load balancer, an application server, any other type of network-enabled service, or any combination thereof.

In one or more embodiments of the invention, the virtual network protocol stack (122, 132) may include an Internet Protocol (IP) layer, inbound and outbound virtual serialization queues, and a transport layer (not shown). The IP layer, for example, is configured to perform IP level processing for both inbound and outbound data packets. The inbound virtual serialization queue is a queue data structure configured to receive data packets from the IP layer prior to the data packets being processed by the transport layer. The transport layer may be configured to process inbound and outbound data packets in accordance with any transport layer protocols (e.g., Transmission Control Protocol (TCP), User Datagram Protocol (UDP), Datagram Congestion Control Protocol (DCCP), Fiber Channel Protocol (FCP), Stream Control Transmission Protocol (SCTP), Structured Stream Transport (SST), etc.). The outbound virtual serialization queue is a queue data structure configured to receive data packets from the VNIC (120, 130) with which the virtual network stack (122, 132) is associated.

In one or more embodiments of the invention, the VNIC (120, 130) performs Media Access Control (MAC) layer functionality. In such embodiments of the invention, the VNIC (120, 130) may be configured to send and receive network traffic (i.e., data packets) between the virtual machine (116, 128) and the PNIC (101) operatively connected to the blade chassis (100). Accordingly, in such embodiments of the invention, the VNIC (120, 130) includes the functionality of a PNIC, and appears as a PNIC to the virtual machine (116, 128) associated with the VNIC (120, 130).

In one or more embodiments of the invention, each virtual machine (116, 128) may be associated with an arbitrary number of VNICs, thereby providing increased flexibility in the types of networking functionality available to the virtual machines (116, 128). For example, the virtual machine (116, 128) may use a first VNIC for incoming network traffic and a second VNIC for outgoing network traffic. VNICs in accordance with one or more embodiments of the invention are described further in: (i) commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi; and (ii) commonly owned U.S. Pat. No. 7,613,132, entitled "Method and System for Controlling Virtual Machine Bandwidth" in the names of Sunay Tripathi, Tim P. Marsland, and Nicolas G. Droux. The contents of the aforementioned applications are hereby incorporated by reference in their entirety.

In one or more embodiments of the invention, the network function driver (118, 119) is an interface configured to provide the virtual machine (116, 128) with direct access and control to the PNIC (101) operatively connected to the blade chassis (100). Specifically, as discussed above, the network function driver (118, 119) uses the network function (105, 106) mapped between the virtual machine (116, 128) and the PNIC (101) to directly transfer network traffic (i.e., data packets) between the virtual machine (116, 128) and the PNIC (101).

In one or more embodiments of the invention, the chassis interconnect (112) may be used to connect one or more blades (114, 126) with shared computing resources (e.g., one or more PNICs, input/output means including such as a keyboard, mouse, or display monitor, and other computer components/peripherals). For example, as shown in FIG. 1A, the chassis interconnect (112) connects multiple blades (114, 126) with shared computing resources including the PNIC (101). Further, in one or more embodiments of the invention, the chassis interconnect (112) is used to connect and thereby enable communication among multiple blades (114, 126). In one or more embodiments of the invention, the connectivity provided by the chassis interconnect (112), as described above, is achieved without requiring use of traditional network wires (e.g., Ethernet cables).

In one or more embodiments of the invention, the chassis interconnect (112) may be a Peripheral Component Interface Express (PCI-E) backplane. In one or more embodiments of the invention, the chassis interconnect (112) may include a number of PCI-E endpoints (not shown). Accordingly, in such embodiments, a PCI-E endpoint (not shown) is used to connect one or more blades (114, 126) with the blade chassis (100) such that the blades (114, 126) may be configured to communicate (e.g., with another blade, with a shared resource operatively connected to the blade chassis) using PCI-E endpoints (i.e., as opposed to using traditional network wires). Those skilled in the art will appreciate that other connection technologies may be used to connect one or more blades (114, 126) to a blade chassis (100).

Figure 1B:
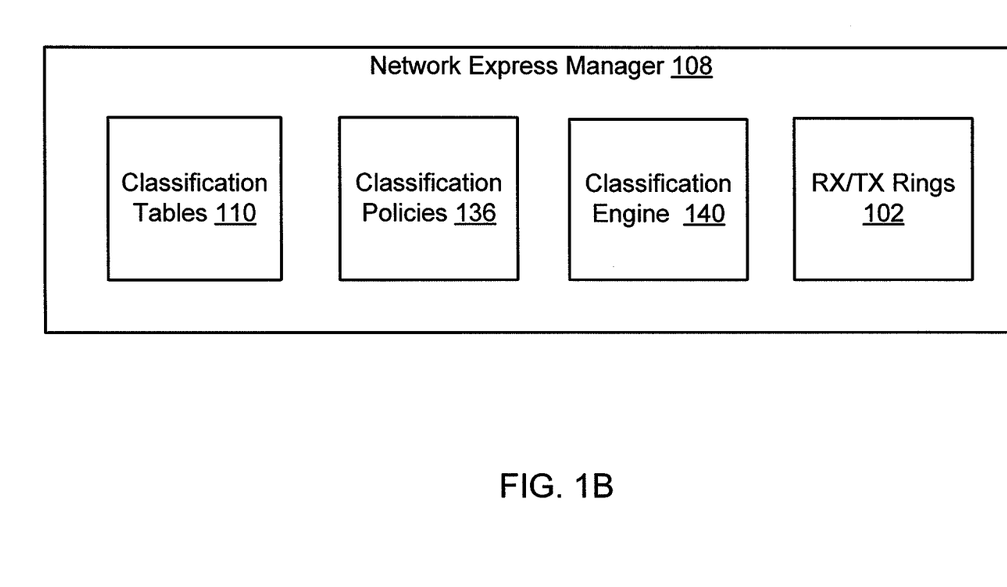

FIG. 1B shows components included in the NEM (108), in accordance with one or more embodiments of the invention. In one or more embodiments, the NEM (108) may be configured to manage internal communications between multiple blades (114, 126) in addition to internal communications between a blade (114, 126) and a PNIC (101). As such, the NEM (108) is configured to manage the routing of network traffic between the various components operatively connected to a blade chassis. In one or more embodiments of the invention, the network express manager (108) may be any combination of hardware, software, and/or firmware including executable logic for performing the described network routing functions.

In one or more embodiments of the invention, the NEM (108) includes a virtual switching table (not shown). The virtual switching table may include one or more mappings, with each mapping associating a VNIC identifier for a VNIC (120, 130) with a VNIC location in the chassis interconnect (112). In one or more embodiments, where the chassis interconnect (112) is a PCI-E backplane, the VNIC identifier for a VNIC (120, 130) may be an Internet Protocol (IP) addresses, and the VNIC location may be a PCI-E endpoint associated with a blade (114, 126) upon which the VNIC (120, 130) is executing.

In one or more embodiments of the invention, the management of the virtual switching table by the NEM (108) facilitates the creation of a virtual network path. Accordingly, in such embodiments of the invention, virtual machines (116, 128) located in different blades (114. 126) may be interconnected to form an arbitrary virtual network topology, where the VNICs (120, 130) associated with each virtual machine (116, 128) do not need to know the physical locations of other VNICs. Further, if a virtual machine (116, 128) is migrated from one blade to another, the virtual network topology may be preserved merely by updating the virtual switching table to reflect the a new physical location for the VNIC (i.e., a different PCI-E endpoint).

The virtual switching table may include one or more mappings, with each mapping associating a VNIC identifier for a VNIC (120, 130) with a VNIC location in the chassis interconnect (112). In one or more embodiments, where the chassis interconnect (112) is a PCI-E backplane, the VNIC identifier for a VNIC (120, 130) may be an Internet Protocol (IP) addresses, and the VNIC location may be a PCI-E endpoint associated with a blade (114, 126) upon which the VNIC (120, 130) is executing. In one or more embodiments, the VNIC identifiers are not used directly by the NEM (108), but rather are used indirectly via the network functions (105, 106).

In one or more embodiments, the NEM (108) may include one or more classification tables (110). In one or more embodiments, a first classification table (110) may be configured to store a first type of mapping that associates a Layer 2 (L2) address with a network function, and may be referred to as a "L2 table." In one or more embodiments, a L2 address is a data link layer address in accordance with the Open Systems Interconnection (OSI) model. In one or more embodiments, a second classification table (110) may be configured to store a second type of mapping that associates a network function with a DMA target vector, and may be referred to as a "NF table." In one or more embodiments, a third classification table (110) may be configured to store a third type of mapping that associates a key with a DMA target vector, and may be referred to as a "multicast/broadcast table." In one or more embodiments, the classification tables (110) may be stored by the NEM (108) using any persistent storage device and data format. For example, in one or more embodiments, the classification tables (110) may be stored as ternary content-addressable memory (TCAM) entries using a TCAM device configured for implementing high speed searches. Examples of the aforementioned classification tables (110) are discussed below with reference to FIGS. 2A-2C.

In one or more embodiments of the invention, the NEM (108) may include multiple receive and transfer (RX/TX) rings (102). In one or more embodiments of the invention, one or more RX/TX rings (102) may be assigned to a specific VNIC (120, 130) for the temporary storage of inbound and outbound network traffic, respectively.

In one or more embodiments of the invention, the classification tables (110) may include one or more entries describing resources assigned to each VNIC (120, 130), as well as data associated with each VNIC (120, 130). For example, one or more entries of the classification tables (110) may specify that a given VNIC (120, 130) is associated with one or more RX/TX rings (102), a link status (e.g., link speed, number of dropped packets, link up/down, link active/inactive, etc.), a MAC address, and the like.

In one or more embodiments, the NEM (108) may include one or more classification policies (136). In one or more embodiments, a classification policy may be a deterministic algorithm that directs the routing of network traffic within the blade chassis (100) (i.e., the internal communication between blades, or between a blade and a PNIC). For example, a classification policy may be to deliver packets to all threads in a set of threads, to deliver packets to each thread in sequence, to deliver packets based on a hash function (e.g., Message-Digest algorithm 5 (MD5), Secure Hash Algorithm (SHA)), and the like. In one or more embodiments of the invention, the one or more classification policies (136) may be stored in a policy store (not shown) implemented using a persistent storage device.

In one or more embodiments of the invention, the NEM (108) includes a classification engine (140) configured to manage components related to the routing of network traffic within the blade chassis (100). Specifically, in one or more embodiments, the classification engine (140) may be configured to manage the classification tables (110), the classification policies (136), and/or the virtual switching table described above. For example, the classification engine (140) may add, remove, and/or modify mappings included in the classification tables (110) and the virtual switching table. In another example, the classification engine (140) may add, remove, and/or modify the classification policies (136).

In one or more embodiments, the classification engine (140) may also be configured to classify and/or route network traffic within the blade chassis (100). In one or more embodiments, the classification engine (140) may be configured to classify network traffic based on the classification tables (110), the classification policies (136), and/or the virtual switching table described above. Further, in one or more embodiments, the classification engine (140) may be configured to classify a multicast/broadcast packet such that the multicast/broadcast packet does not loop back to the source (i.e., is not routed back to the sending network function). The functionality of the classification engine (140) is further described below with reference to FIGS. 3, 4A-4B, and 5.

Figure 2A:
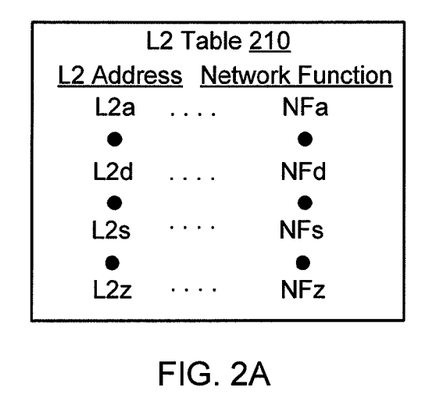
FIGS. 2A-2C show examples of mappings used to maintain data, in accordance with one or more embodiments of the invention.
Figure 2B:
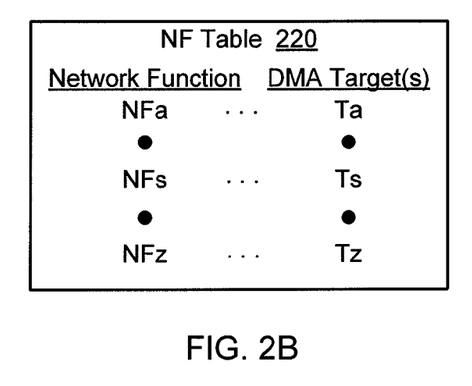
Figure 2C:
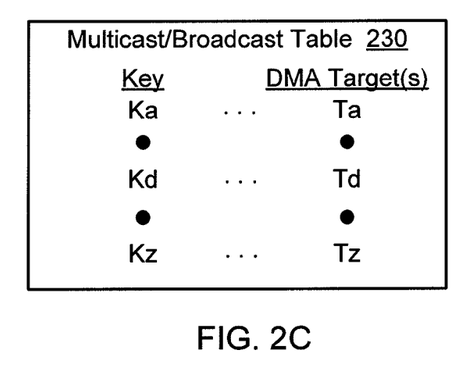

FIGS. 2A-2C show examples of mappings used to maintain data in accordance with one or more embodiments of the invention. In one or more embodiments of the invention, the mappings discussed in relation to FIGS. 2A-2C are stored in one or more classification tables (110).

FIG. 2A shows a L2 table (210) storing mappings that associate L2 addresses with network functions. As previously discussed, in one or more embodiments of the invention, a L2 address is a data link layer address in accordance with the OSI model. Further, in one or more embodiments, a network function may be a physical or virtual function used to manage data movement for the PNIC. As shown in FIG. 2A, the L2 table (210) includes, by way of example, mappings between: (i) L2 address L2a and network function NFa; (ii) L2 address L2d and network function NFd; (iii) L2 address L2s and network function NFs; and (iv) L2 address L2z and network function NFz.

FIG. 2B shows a network function (NF) table (220) storing mappings that associate network functions with Direct Memory Access (DMA) target vectors. In one or more embodiments, a DMA target vector may be a listing of DMA channels which are available to transfer packets. In one or more embodiments, a DMA channel may be a direct data transfer path for the transfer of data (e.g., data packets) from one component to another (e.g., from a PNIC to a blade). In one or more embodiments, a DMA target vector may be expressed as a bitmap. As shown in FIG. 2B, the NF table (220) includes, by way of example, mappings between: (i) network function NFa and DMA target vector Ta; (ii) network function NFs and DMA target vector Ts; and (iii) network function NFz and DMA target vector Tz.

FIG. 2C shows a multicast/broadcast table (230) storing mappings that associate keys with DMA target vectors. In one or more embodiments of the invention, a key is a unique value that may be obtained as a function of a destination L2 address. As shown in FIG. 2C, the multicast/broadcast table (230) includes, by way of example, mappings between: (i) key Ka and DMA target vector Ta; (ii) key Kd and DMA target vector Td; and (iii) key Kz and DMA target vector Tz.

A person of skill in the art will note that the software environments shown in FIGS. 1A-1B and 2A-2C are exemplary embodiments, and are not intended to limit the invention. For example, for sake of clarity, the blade chassis (100) is shown as including two blades (114, 126). However, it is contemplated that the blade chassis (100) may include any number of blades (114, 126). In another example, it is contemplated that any of the functionality described above with reference to the aforementioned components (e.g., classification tables (110), classification policies (136), classification engine (140), and the like) may be implemented in any other software component. In yet another example, in one or more embodiments, the NEM (108) and the PNIC (101) may be included as a single hardware module (not shown) operatively connected to the blade chassis. Alternatively, in one or more embodiments, the NEM (108) may be independently implemented apart from the PNIC (101) in hardware, software, or firmware.

Figure 3:
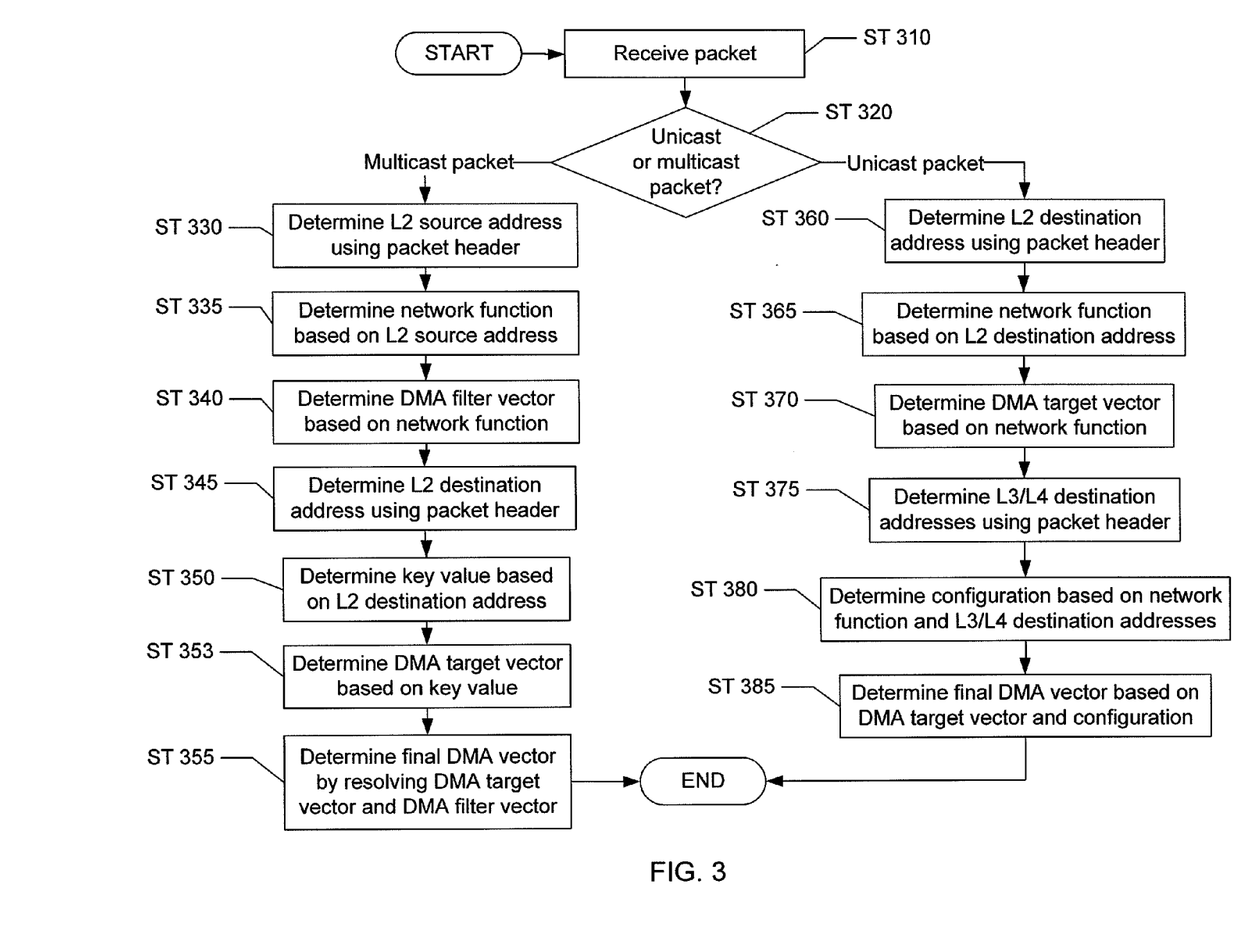
FIG. 3 shows a flowchart, in accordance with one or more embodiments of the invention.
Figure 4A:
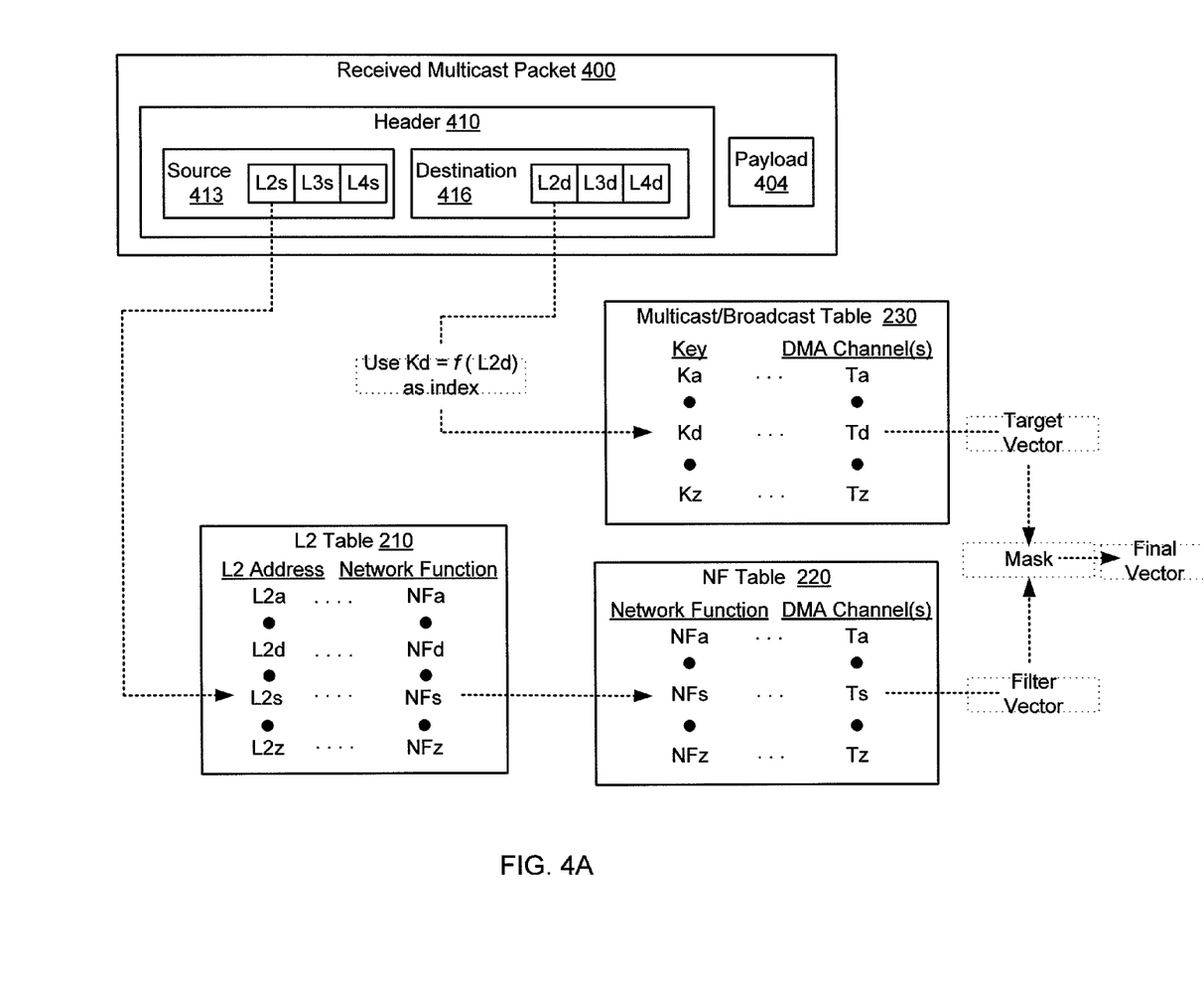
FIG. 4A-4B show examples of data flow, in accordance with one or more embodiments of the invention.
Figure 4B:
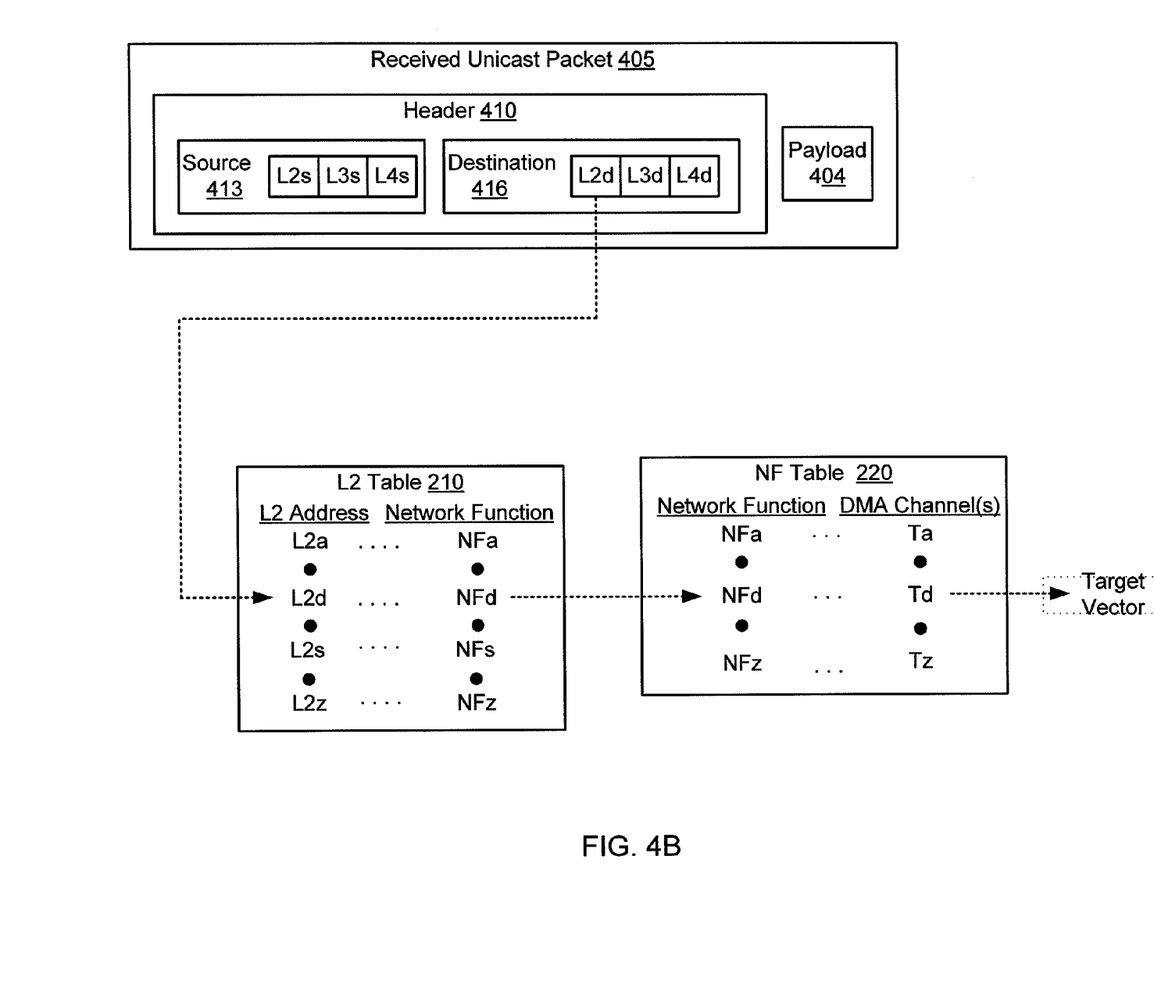

FIG. 3 shows a flowchart of a method for routing inter-blade traffic within a blade chassis, in accordance with one or more embodiments of the invention. In one or more embodiments, the process shown in FIG. 3 may correspond to the software environment described above with reference to FIGS. 1A-1B and 2A-2C. Further, for the sake of illustration, the process shown in FIG. 3 may be described below with reference to the examples shown in FIGS. 4A-4B. Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention At ST 310, a packet originating within the blade chassis is received by a NEM. In one or more embodiments, the packet may include a packet header and a payload. For example, referring to FIG. 1A, the NEM (108) may receive a packet issued by network function 1 (104).

At ST 320, a determination is made about whether the received packet is a unicast packet or a multicast packet. For example, referring to FIG. 1A, the classification engine (140) may determine whether the received packet is a unicast packet or a multicast packet. In one or more embodiments, a unicast packet is addressed to a single network destination. In one or more embodiments, a multicast packet is a packet addressed to a multicast address representing a defined group of network destinations. A multicast packet may be a broadcast packet (i.e., a packet addressed to a broadcast address representing all network destinations in a local network).

If it is determined at ST 320 that the packet is a multicast packet, then at ST 330, the L2 source address (i.e., the L2 address of the network function that issued the packet) may be determined using the packet header. For example, referring to FIGS. 1B and 4A, the classification engine (140) may parse a source address (413) included in a header (410) of a received multicast packet (400), and may thereby determine that the L2 source address of the packet is L2s. In one or more embodiments, the received multicast packet (400) also includes a payload (404).

At ST 335, the source network function (i.e., the network function that was used to send the packet) may be determined based on the L2 source address (determined at ST 330). For example, referring to FIGS. 1B and 4A, the classification engine (140) may look up the L2 source address L2s in the L2 table (210), and thereby determine that the source network function is NFs.

At ST 340, a DMA filter vector (i.e., a listing of the DMA channels which are not available to transfer the multicast packet) may be determined based on the network function (determined at ST 335). For example, referring to FIGS. 1B and 4A, the classification engine (140) may look up the network function NFs in the NF table (220), and thereby determine that the DMA filter vector is Ts.

At ST 345, the L2 destination address (i.e., the L2 address of the network function to which the packet is sent) may be determined using the packet header. For example, referring to FIGS. 1B and 4A, the classification engine (140) may parse a destination address (416) included in the header (410) to determine that the L2 destination address of the packet is L2d.

At ST 350, a key value may be determined based on the L2 destination address (determined at ST 345). In one or more embodiments of the invention, the key may be generated using a deterministic algorithm (e.g., a hash function such as MD5 or SHA-1) that generates a unique value (i.e., the key) for a given input (i.e., the L2 destination address). For example, referring to FIGS. 1B and 4A, the classification engine (140) may apply a predefined function $f(\ )$ to the L2 destination address L2d, and thereby generate the key value Kd.

At ST 353, a DMA target vector (i.e., a listing of the DMA channels which are available to transfer the multicast packet) may be determined based on the key value (determined at ST 350). For example, referring to FIGS. 1B and 4A, the classification engine (140) may look up the key value Kd in the multicast/broadcast table (230), and thereby determine that the DMA target vector is Td.

At ST 355, a final DMA vector (i.e., a listing of the DMA channels which are to be used to transfer the multicast packet) may be determined by resolving the DMA target vector (determined at ST 353) with the DMA filter vector (determined at ST 340). In one or more embodiments, the final DMA vector excludes the DMA channels assigned to the packet source, thereby preventing the multicast packet from looping back to the packet source. In one or more embodiments, ST 355 may involve performing a mask operation on the DMA target vector using the DMA filter vector. Further, in one or more embodiments, the mask operation may be a bitwise AND operation. For example, referring to FIGS. 1B and 4A, the classification engine (140) may perform a mask operation (e.g., a bitwise AND operation) on the DMA target vector Td using the DMA filter vector Ts to obtain a final DMA vector. The mask operation is described further below with reference to FIG. 5.

After ST 355, the process ends. At this stage, the packet may be multicast (or broadcast) using the final DMA vector (determined at ST 355). For example, referring to FIGS. 1A-1B and 4A, the NEM (108) may transfer the received multicast packet (400) to multiple destinations using the final DMA vector.

Referring again to ST 320, if it is determined that the packet is a unicast packet, then at ST 360, the L2 destination address may be determined using the packet header. For example, referring to FIGS. 1B and 4B, the classification engine (140) may parse a destination address (416) included in a header (410) of a received unicast packet (405), and may thereby determine that the L2 destination address of the unicast packet is L2d. In one or more embodiments, the received unicast packet (405) also includes a payload (404).

At ST 365, the destination network function (i.e., the network function to which the packet is sent) may be determined based on the L2 destination address (determined at ST 360). For example, referring to FIGS. 1B and 4B, the classification engine (140) may look up the L2 destination address L2d in the L2 table (210), and may thereby determine that the destination network function is NFd.

At ST 370, a DMA target vector (i.e., a listing of the DMA channels which are available to transfer the unicast packet) may be determined based on the destination network function (determined at ST 365). For example, referring to FIGS. 1B and 4B, the classification engine (140) may look up the destination network function NFd in the NF table (220), and thereby determine that the DMA target vector is Td.

At ST 375, a Layer 3 (L3) destination address and a Layer 4 (L4) destination address may be determined using the packet header. In one or more embodiments of the invention, a L3 address is a network layer address (e.g., IP address) in accordance with the OSI model. In one or more embodiments of the invention, a L4 address is a transport layer address (e.g., TCP address) in accordance with the OSI model. For example, referring to FIGS. 1B and 4B, the classification engine (140) may parse the destination address (416) included in the header (410) to determine the L3 and L4 destination addresses of the received unicast packet (405).

At ST 380, a configuration may be determined based on the L3/L4 destination addresses (determined at ST 375). In one or more embodiments of the invention, the configuration may specify one or more aspects of packet classification (e.g., which VLAN to send the packet to, how to spread packets among processing threads, how to load-balance the packet processing, which DMA channels to use or avoid, and the like). Further, in one or more embodiments of the invention, the configuration may be based on other factors in addition to the L3/L4 destination addresses (e.g., a VLAN, a packet spreading policy, and the like). For example, referring to FIGS. 1B and 4B, the classification engine (140) may determine a configuration based on the L3 and L4 destination addresses of the received unicast packet (405).

At ST 385, a final DMA vector (i.e., a listing of the DMA channels which are to be used to transfer the unicast packet) may be determined based on the DMA target vector (determined at ST 370) and the configuration (determined at ST 380). In one or more embodiments, ST 385 may involve adding or removing DMA channels from the DMA target vector based on the configuration. For example, referring to FIGS. 1B and 4B, the classification engine (140) may refine the DMA target vector Td using a configuration (not shown).

After ST 385, the process ends. At this stage, the packet may be unicast using the final DMA vector (determined at ST 385). For example, referring to FIGS. 1A and 4B, the NEM (108) may transfer the received unicast packet (405) using the final DMA vector.

Figure 5:
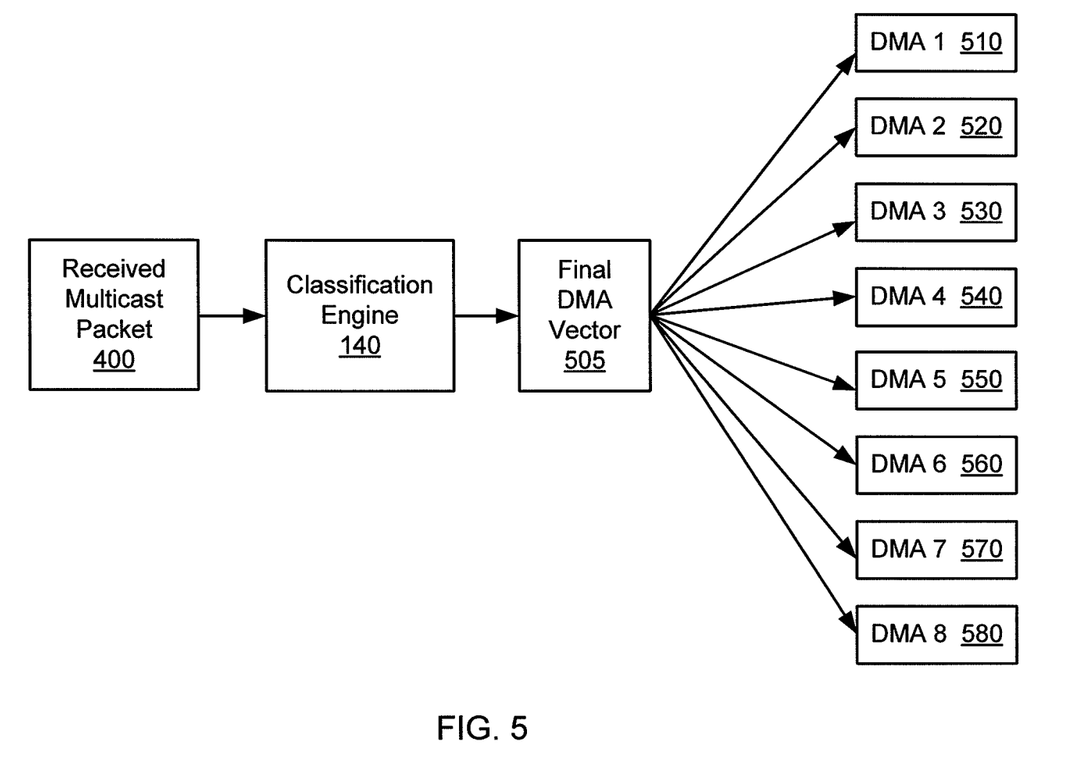
FIG. 5 shows an example, in accordance with one or more embodiments of the invention.

FIG. 5 shows an example, in accordance with one or more embodiments of the invention. This example is not intended to limit the scope of the invention. As shown, the received multicast packet (400) may be processed by the classification engine (140) to generate in a final DMA vector (505). Such processing may be performed in accordance with the methods described above with reference to FIG. 3.

In the example shown in FIG. 5, there are eight DMA channels available, namely DMA 1 (510), DMA 2 (520), DMA 3 (530), DMA 4 (540), DMA 5 (550), DMA 6 (560), DMA 7 (570), and DMA 8 (580). Accordingly, the final DMA vector (505) may be a bitmap of eight bits, with each bit (from right to left) corresponding to DMA channels 1-8. For example, assume that the final DMA vector (505) is expressed as "[1 0 0 0 0 0 1 1]," where a "1" indicates a DMA channel that is to be used to transfer the packet, and a "0" indicates a DMA channel that is not to be used to transfer the packet. Accordingly, in this example, a final DMA vector (505) expressed as "[1 0 0 0 0 0 1 1]" may indicate that DMA 1 (510), DMA 2 (520), and DMA 8 (580) are to be used to transfer the multicast packet (400).

In one or more embodiments, a bitmap having a given number of bits (e.g., eight bits) may be used to assign a larger number of DMA channels (e.g., 16 channels) to a set of network functions by performing a bitwise shift. For example, assuming a set of 16 network functions, a DMA vector of eight bits may be used to assign a set of 16 DMA channels by selectively shifting the DMA vector by eight bit locations. Specifically, for network functions 1-8, the DMA vector may be used without being shifted. However, for network functions 9-16, the DMA vector may be shifted by eight bits. In this manner, the DMA vector may represent a larger number of DMA channels than the number of available bits.

A first exemplary scenario is now described with reference to FIG. 5. Assume that a blade chassis includes two blades (e.g., blade 1 and blade 2), where blade 1 includes two network functions (e.g., NF 1 and NF 2). Assume further that NF 1 has two L2 destination addresses (e.g., DA 1 and DA 2). In addition, assume that DA 1 is assigned to use DMA 1 (510), and DA 2 is assigned to use either DMA 1 (510) or DMA 2 (520). Finally, assume that NF 1 issues a broadcast packet having the DMA target vector "[1 1 1 1 1 1 1 1]" indicating that all eight DMA channels are available to transfer a broadcast packet.

In this scenario, the DMA filter vector for NF 1 is "[0 0 0 0 0 0 1 1]." That is, because DMA 1 (510) and DMA 2 (520) are assigned to the two destination addresses of NF 1 (i.e., DA 1 and DA 2), the DMA filter vector indicates that DMA 1 (510) and DMA 2 (520) are not to be used to transfer the broadcast packet issued from NF 1. The mask operation (i.e., a bitwise AND operation) is performed on the DMA target vector (i.e., "[1 1 1 1 1 1 1 1]") using the complement of the DMA filter vector (i.e., "[1 1 1 1 1 1 0 0]") to obtain the final DMA vector (i.e., "[1 1 1 1 1 1 0 0]"). Thus, the final DMA vector indicates that only DMA 3 (530), DMA 4 (540), DMA 5 (550), DMA 6 (560), DMA 7 (570), and DMA 8 (580) are to be used to transfer the broadcast packet, thereby preventing the broadcast packet from looping back to NF 1.

A second exemplary scenario is now described with reference to FIG. 5. Assume that NF 2 has two L2 destination addresses (e.g., DA 3 and DA 4). In addition, assume that DA 3 is assigned to use either DMA 1 (510) or DMA 2 (520), and DA 4 is assigned to use either DMA 5 (550) or DMA 6 (560). Finally, assume that NF 2 issues a multicast packet having the DMA target vector "[1 1 1 1 1 0 0 0]," indicating that DMA channels DMA 4 (540), DMA 5 (550), DMA 6 (560), DMA 7 (570), and DMA 8 (580) are available to transfer a multicast packet.

In this scenario, the DMA filter vector for NF 2 is "[0 0 1 1 0 0 1 1]." That is, because DMA 1 (510) and DMA 2 (520) are assigned to DA 3, and DMA 5 (550) and DMA 6 (560) are assigned to DA 4, the DMA filter vector indicates that DMA 1 (510), DMA 2 (520), DMA 5 (550), and DMA 6 (560) are not to be used to transfer the multicast packet issued from NF 2. The mask operation (i.e., a bitwise AND operation) is performed on the DMA target vector (i.e., "[1 1 1 1 1 0 0 0]") using the complement of the DMA filter vector (i.e., "[1 1 0 0 1 1 0 0]") to obtain the final DMA vector (i.e., "[1 1 0 0 1 0 0 0]"). Thus, the final DMA vector indicates that only DMA 4 (540), DMA 7 (570), and DMA 8 (580) are to be used to transfer the multicast packet, thereby preventing the multicast packet from looping back to NF 2.

Figure 6:
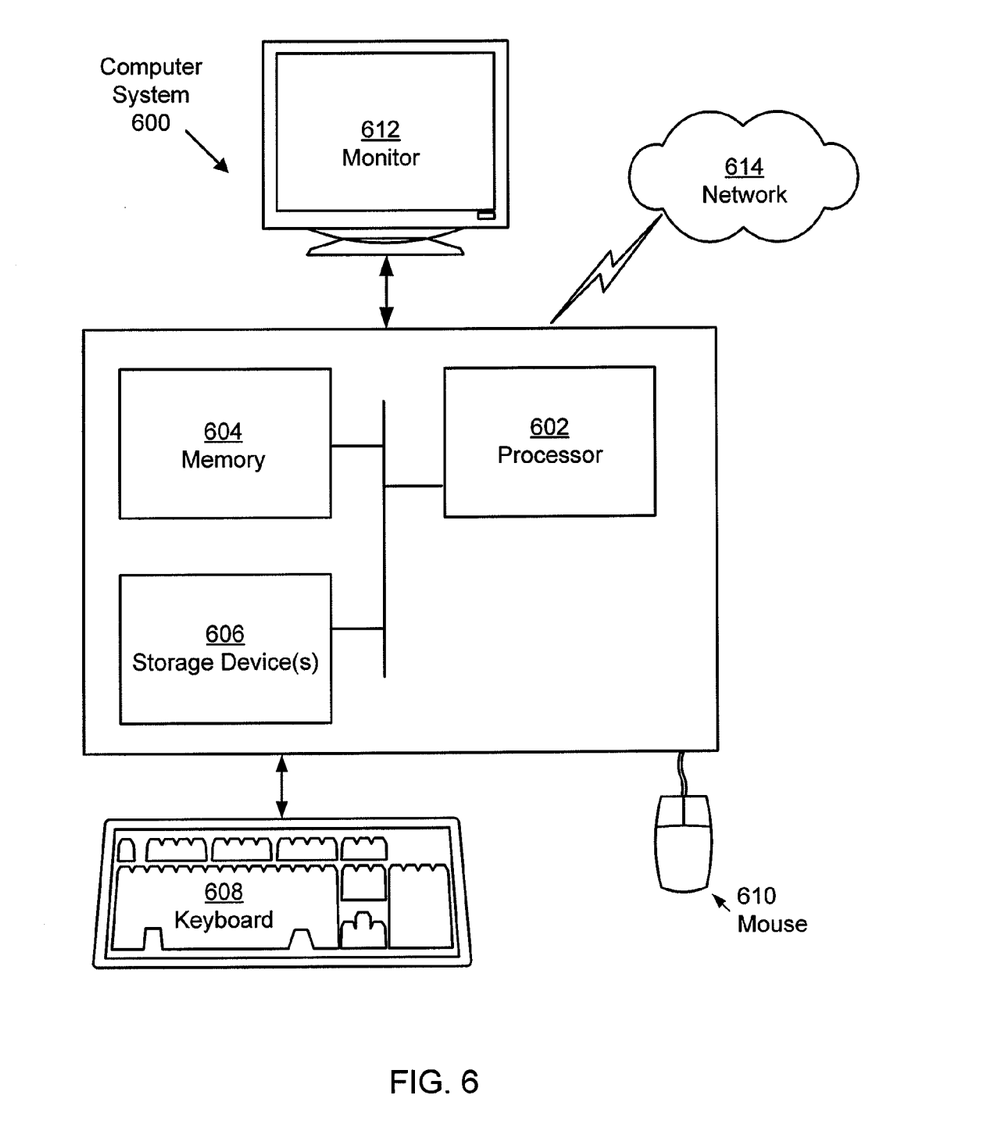
FIG. 6 shows a diagram of a computer system, in accordance with one or more embodiments of the invention.

Embodiments of the invention may be implemented on virtually any type of computer regardless of the platform being used. For example, as shown in FIG. 6, a computer system (600) includes one or more processors (602), associated memory (604) (e.g., random access memory (RAM), cache memory, flash memory, etc.), storage device(s) (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, instructions to perform embodiments of the invention may be stored on a computer readable storage medium such as a compact disc (CD), a diskette, a tape, physical memory, or any other tangible computer readable storage medium that includes functionality to store computer readable program code to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code configured to, when executed by a processor, implement a method for classifying a multicast packet, the method comprising:
    receiving, at a classification engine on a network express manager operatively connected to a chassis interconnect, the multicast packet sent from a packet source associated with a source address on a first blade and targeting a packet destination associated with a destination address on a second blade, wherein the first blade and the second blade are operatively connected to the chassis interconnect;
    determining, based on the source address of the multicast packet, a Direct Memory Access (DMA) filter vector;
    determining, based on the destination address of the multicast packet, a DMA target vector, wherein the DMA target vector comprises a listing of DMA channels which are available to transfer the multicast packet;
    determining a DMA final vector based on the DMA filter vector and the DMA target vector; and
    sending the multicast packet according to the DMA final vector by transferring the multicast packet to the second blade using DMA channels corresponding to the DMA final vector.

2. The computer readable storage medium of claim 1, further comprising:
    receiving a unicast packet;
    determining, using a destination address of the unicast packet, a second DMA target vector; and
    classifying the unicast packet according to the second DMA target vector.

3. The computer readable storage medium of claim 2, further comprising:
    sending the unicast packet according to the second DMA final vector.

4. The computer readable storage medium of claim 2, wherein determining the second DMA target vector comprises:
    determining, using the destination address of the unicast packet, a network function; and
    determining the second DMA target vector associated with the network function.

5. The computer readable storage medium of claim 2, wherein determining the second DMA target vector comprises using one selected from a group consisting of: a level 3 (L3) address, a level (L4) address, a virtual local area network (VLAN), and a packet spreading policy.

6. The computer readable storage medium of claim 1, wherein determining the DMA filter vector comprises:
    determining, using the source address of the multicast packet, a network function associated with the packet source; and
    determining the DMA filter vector associated with the network function.

7. The computer readable storage medium of claim 6, wherein determining the network function associated with the packet source comprises querying a first data structure describing a plurality of relationships between a plurality of level 2 (L2) addresses and a plurality of network functions.

8. The computer readable storage medium of claim 7, wherein determining the DMA filter vector associated with the network function comprises querying a second data structure describing a plurality of relationships between at least one network function and a plurality of DMA channels.

9. The computer readable storage medium of claim 1, wherein determining the DMA target vector comprises:
    determining a first key value using the destination address of the multicast packet; and
    determining the DMA target vector associated with the first key value.

10. The computer readable storage medium of claim 1, wherein the DMA filter vector and the DMA target vector are expressed as bitmaps.

11. The computer readable storage medium of claim 1, wherein the DMA final vector comprises a listing of DMA channels which are used to transfer the multicast packet.

12. The computer readable storage medium of claim 1, wherein the source address of the multicast packet is a level 2 (L2) source address included in a packet header of the multicast packet.

13. The computer readable storage medium of claim 1, wherein determining the DMA final vector comprises:

performing a mask operation on the DMA target vector using the DMA filter vector.

14. The computer readable storage medium of claim 13, wherein the mask operation is a bitwise AND operation.

15. A system, comprising:
a chassis interconnect;
a physical network interface;
a first blade and a second blade communicatively coupled with each other via the chassis interconnect,
wherein the first blade and the second blade share the physical network interface,
wherein the first blade comprises a packet source,
wherein the second blade comprises a packet destination; and
a network express manager (NEM), operatively connected to the chassis interconnect, configured to:
receive a multicast packet from the packet source on the first blade;
determine, based on a source address of the multicast packet, a Direct Memory Access (DMA) filter vector, wherein the source address is associated with the packet source on the first blade;
determine, based on a destination address of the multicast packet, a DMA target vector, wherein the destination address is associated with the packet destination on the second blade;
determine a DMA final vector based on the DMA filter vector and the DMA target vector; and
send the multicast packet according to the DMA final vector by transferring the multicast packet to the second blade using DMA channels corresponding to the DMA final vector.

16. The system of claim 15, wherein the multicast packet is a broadcast packet.

17. The system of claim 15, wherein the NEM comprises a plurality of classification policies, wherein each of the plurality of classification policies is a deterministic algorithm that directs a routing of network traffic within the system.

18. The system of claim 15, wherein the NEM comprises a first data structure describing a plurality of relationships between a plurality of level 2 (L2) addresses and a plurality of network functions.

19. The system of claim 18, wherein the NEM comprises a second data structure describing a plurality of relationships between at least one network function and a plurality of DMA channels and a third data structure describing a plurality of relationships between one or more keys and the plurality of DMA channels.

* * * * *

UNITED STATES PATENT AND TRADEMARK OFFICE
CERTIFICATE OF CORRECTION

Page 1 of 1

PATENT NO. : 8,913,613 B2
APPLICATION NO. : 13/028593
DATED : December 16, 2014
INVENTOR(S) : Srinivasan et al.

It is certified that error appears in the above-identified patent and that said Letters Patent is hereby corrected as shown below:

In the Specification

In column 7, line 5, delete "the a" and insert -- a --, therefor.

In column 9, line 34, delete "invention" and insert -- invention. --, therefor.

In the Claims

In column 14, line 31, in Claim 5, delete "level (L4)" and insert -- level 4 (L4) --, therefor.

Signed and Sealed this
Fourth Day of August, 2015

Michelle K. Lee
*Director of the United States Patent and Trademark Office*